(No Model.)
F. P. CROSBY.
SPROCKET WHEEL FASTENING FOR VELOCIPEDES.
No. 510,242. Patented Dec. 5, 1893.
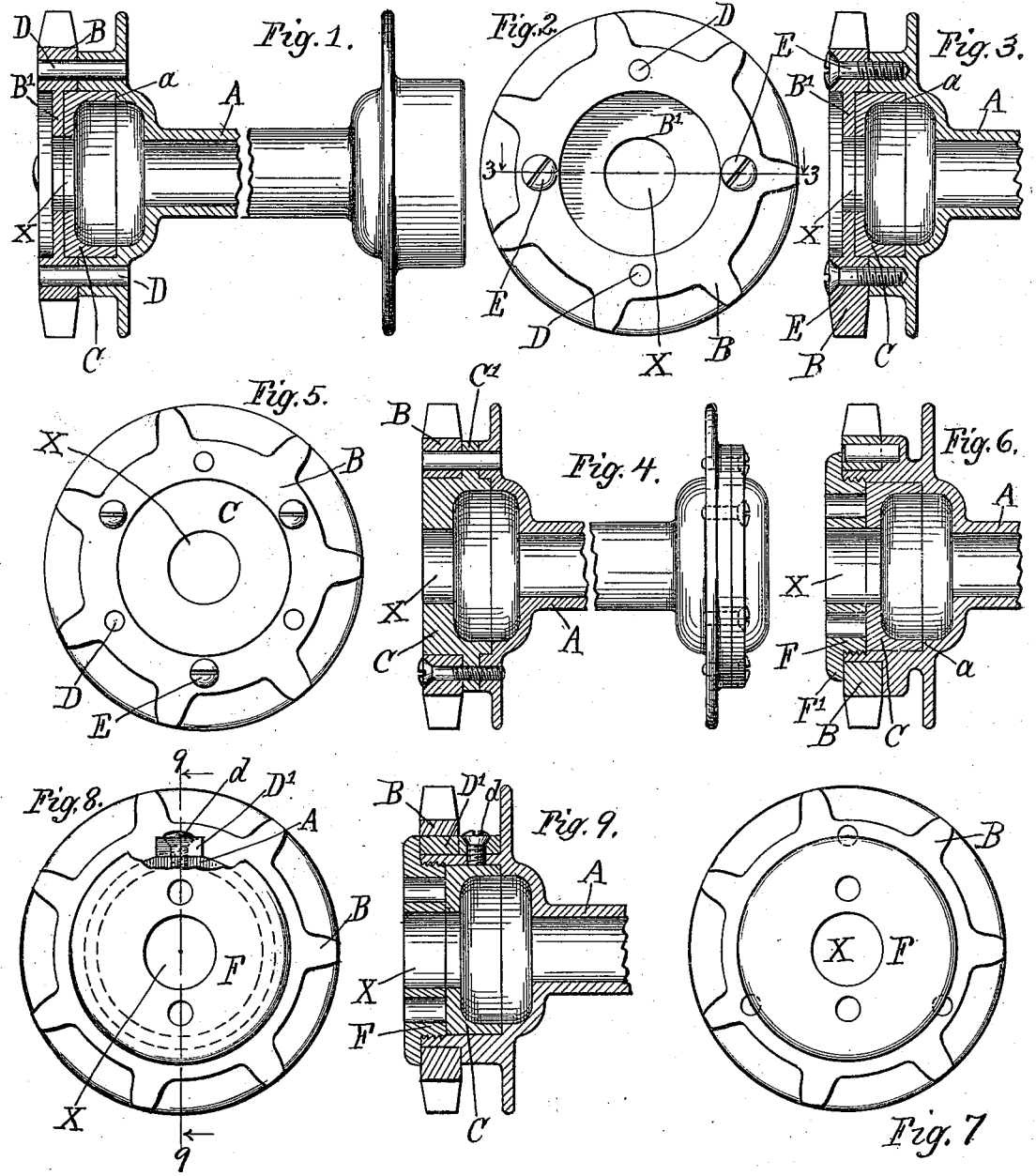

UNITED STATES PATENT OFFICE.

FRANK P. CROSBY, OF CHICAGO, ILLINOIS.

SPROCKET-WHEEL FASTENING FOR VELOCIPEDES.

SPECIFICATION forming part of Letters Patent No. 510,242, dated December 5, 1893.

Application filed November 21, 1892. Serial No. 452,673. (No model.)

*To all whom it may concern:*

Be it known that I, FRANK P. CROSBY, a citizen of the United States, residing at Chicago, county of Cook, and State of Illinois, have invented certain new and useful Improvements in Sprocket-Wheel Fastenings for Velocipedes, which are fully set forth in the following specification, reference being had to the accompanying drawings, forming a part thereof.

In the drawings:—Figure 1 is a partly sectional plan of the hub of the drive wheel and sprocket wheel thereon embodying my invention, section being made axially through the ball-case to which the sprocket wheel is attached. Fig. 2 is an elevation of the same at the end having the sprocket pinion. Fig. 3 is a section at the line 3—3 on Fig. 2. Fig. 4 is a view similar to Fig. 1, showing a slight modification of the form and means of securing the cap of the ball-case and the sprocket rim to the hub. Fig. 5 is an end elevation of the same. Fig. 6 is a section of the sprocket bearing end of the hub having a modified means of retaining the sprocket rim in place. Fig. 7 is an end elevation of the form shown in Fig. 6. Fig. 8 is a similar elevation showing a still further modification of the means of securing the sprocket rim. Fig. 9 is an axial section at the line 9—9 on Fig. 8.

Two common principles are exemplified in all the forms of fastening shown in the above-described drawings. These principles are:— first, that the resistance to rotation of the sprocket wheel or pinion on the shaft is afforded by connection with the shaft, and is afforded by other means than that which secures the wheel longitudinally on the shaft; second, that the means of connection are such as to permit the reversal of the sprocket pinion, said pinion being adapted to be fastened by the same means in either position and to align properly in either position. I do not however assert that these principles are broadly new in velocipede construction, but I have embodied them in the several novel constructions illustrated which are specifically related to each other as hereinafter set forth.

In the drawings which represent the drive wheel hub and sprocket pinion, A is the drive wheel hub. B is the sprocket pinion. C is the separable portion of the ball-case. These three elements are present in all the constructions illustrated.

It will be understood that the part commonly called the "cone," which constitutes one member of the ball-bearing, will be located on the axle within the ball-case, and that the counter-part or opposing seat of the balls will be obtained in either one of the two parts which bound the ball-case cavity in the drawings, viz: the chambered hub and the separable part C of the ball-case, according to which way the sleeve faces, and the detail construction and relation of the sleeve and axle to the parts shown, not being material to this invention, said parts are not illustrated.

In the form shown in Figs. 1, 2 and 3, the sprocket pinion is secured against rotation with respect to the wheel by means of pins D D in any suitable number, two being probably sufficient, extending through the flange of the hub outside the ball-case and through the rim of the pinion inside the sprocket, and secured against moving longitudinally with respect to the axis of the wheel by means of the screws E E set through the pinion from the outer side and screwed into the hub. The separable part C of the ball-case is in this construction inclosed between the hub and the pinion, the latter having its web in the form of an annular interiorly projecting flange B', lapping the outer end of the separable part C, and the hub having a shoulder *a* stopping the part C at its inner end.

In the form shown in Figs. 4 and 5, the pins and screws are employed in the same manner as in the form above described except that there are three of each instead of two, the difference between the two constructions being that the separable part C of the ball-case is retained by being provided with a peripherally projecting flange C', which protrudes between the face of the hub and the inner face of the sprocket rim, and is penetrated by the pins and screws and clamped between the hub and rim, and the interiorly projecting flange of the sprocket wheel being thereby rendered unnecessary is omitted, and the part C is extended to fill the entire annular space between the rim of the sprocket wheel and the shaft aperture X.

In the form shown in Fig. 6, the pins are employed as in the preceding forms for the purpose of preventing rotary motion of the sprocket rim, but in lieu of the screws E to prevent longitudinal separation of the parts, there is employed the flange disk F screwed into the end of the aperture in the hub provided for the part C of the ball-case, said aperture being interiorly threaded at the end for this purpose and thereby binding the part C into the hub, while its flange F' binds the sprocket rim onto the hub and extends far enough over the face of the sprocket rim to partly cover the ends of the holes in which the pins D are inserted, so that in case the latter should become loosened from the hub they cannot escape.

In Figs. 8 and 9, I have illustrated a modification which consists in the employment of a single rectangular key instead of two pins, such key D' being lodged in a seat provided for it in the periphery of the cylindrical body of the wheel hub on which the sprocket rim is seated in the same manner as in Figs. 4 and 6, such key being secured by a screw d and a sprocket rim having a rectangular opening through it,—or rather a rectangular notch in its inner periphery adapted to receive the end of the key when the sprocket rim is placed on its seat about the hub. The flange disk F is employed in the same manner as in Fig. 6, to retain the sprocket rim on the hub.

In all of the forms, the sprocket rim is symmetrical about a middle plane at right angles to its axis, so that it may be reversed without throwing it out of alignment with the driving sprocket wheel or out of proper relation to any of the parts to which it is laterally related. In the form shown in Figs. 1, 2 and 3, this symmetry is obtained by making the interior annular flange which binds the part C of the ball-case, in the middle. In the other forms, the sprocket rim being an annulus whose entire width or thickness is seated on the adjusted part, it is reversible without special contrivance for that purpose.

I claim—

1. In a velocipede, in combination with the drive wheel hub, the sprocket wheel or rim coaxial therewith and bound laterally thereto, and the separable part of the ball-case seated in the hub and clamped between said sprocket wheel or rim and the latter: substantially as set forth.

2. In a velocipede, in combination with the drive wheel hub, the separable part of the ball-case laterally adjacent to and centered in the hub, said separable portion of the case having a shoulder or seat for the sprocket wheel or rim concentric with the wheel hub, said sprocket wheel being symmetrical about a plane at right angles to its axis; whereby said sprocket wheel is adapted to be reversibly applied to its seat on the ball-case: substantially as set forth.

In testimony whereof I have hereunto set my hand, in the presence of two witnesses, at Chicago, Illinois, this 14th day of November, 1892.

FRANK P. CROSBY.

Witnesses:
CHAS. S. BURTON,
JEAN ELLIOTT.